United States Patent
Banerjee et al.

(10) Patent No.: US 9,283,531 B2
(45) Date of Patent: Mar. 15, 2016

(54) SPLIT FEED REACTOR BED IN HYDROTREATER DEVICE

(71) Applicant: UOP LLC, Des Plaines, IL (US)

(72) Inventors: Soumendra M. Banerjee, New Delhi (IN); Richard K. Hoehn, Mt. Prospect, IL (US); Srinivasa Gopalan Rajan Varadarajan, Haryana (IN); Parthasarathy Kothandaraman, Haryana (IN)

(73) Assignee: UOP LLC, Des Plaines, IL (US)

( * ) Notice: Subject to any disclaimer, the term of this patent is extended or adjusted under 35 U.S.C. 154(b) by 318 days.

(21) Appl. No.: 14/022,543

(22) Filed: Sep. 10, 2013

(65) Prior Publication Data

US 2015/0073186 A1   Mar. 12, 2015

(51) Int. Cl.
| | |
|---|---|
| *B01J 8/04* | (2006.01) |
| *C10G 45/72* | (2006.01) |
| *C10G 47/36* | (2006.01) |
| *C10G 49/26* | (2006.01) |
| *C10G 65/02* | (2006.01) |
| *B01J 8/00* | (2006.01) |
| *C10G 65/04* | (2006.01) |

(52) U.S. Cl.
CPC ............... *B01J 8/0453* (2013.01); *B01J 8/001* (2013.01); *B01J 8/0492* (2013.01); *B01J 8/0496* (2013.01); *C10G 45/72* (2013.01); *C10G 47/36* (2013.01); *C10G 49/26* (2013.01); *C10G 65/02* (2013.01); *C10G 65/04* (2013.01); *B01J 2208/00061* (2013.01); *B01J 2208/00371* (2013.01)

(58) Field of Classification Search
CPC ......... C10G 45/72; C10G 47/36; C10G 49/26
See application file for complete search history.

(56) References Cited

U.S. PATENT DOCUMENTS

| | | | |
|---|---|---|---|
| 3,260,663 A | 7/1966 | Inwood et al. | |
| 3,607,091 A * | 9/1971 | Boyd ..................... | C10G 49/26 208/143 |
| 3,748,448 A * | 7/1973 | Sayles ..................... | G06G 7/58 208/DIG. 1 |
| 3,972,804 A | 8/1976 | McLaughlin et al. | |
| 3,981,793 A * | 9/1976 | Christie ................. | C10G 47/36 208/108 |
| 5,397,457 A * | 3/1995 | Harandi ................. | C10G 47/18 208/111.01 |
| 5,738,779 A | 4/1998 | Dach et al. | |
| 5,904,835 A | 5/1999 | Thakkar | |
| 5,976,354 A | 11/1999 | Powers et al. | |
| 6,113,775 A | 9/2000 | Christolini et al. | |
| 6,299,759 B1 * | 10/2001 | Bradway ................ | B01J 8/0453 208/108 |
| 6,592,749 B1 | 7/2003 | Lokhandwala et al. | |
| 7,569,136 B2 | 8/2009 | Ackerson et al. | |
| 8,911,616 B2 * | 12/2014 | Banerjee ................ | C10G 45/38 208/264 |

(Continued)

*Primary Examiner* — Jennifer A Leung
(74) *Attorney, Agent, or Firm* — James C. Paschall

(57) ABSTRACT

A hydrotreater reactor device includes a reactor chamber including a first bed and a second bed. A first input is disposed to provide a hydrocarbon stream to the first bed and a second input is disposed to bypass the first bed and provide a hydrocarbon stream to the second bed. A differential temperature controller measures a temperature difference across the first bed. A control valve at the second input adjusts an amount of the hydrocarbon stream admitted through the second input based on the measured temperature difference. A charge heater provides a hydrocarbon stream as an output through a split output line having a first branch connected to the first input and in fluid communication with the first bed, and a second branch connected to the second input and in fluid communication with the second bed. A restrictor downstream of the split controls a pressure drop at the first input.

12 Claims, 1 Drawing Sheet

(56) References Cited

U.S. PATENT DOCUMENTS

| | | |
|---|---|---|
| 2004/0108111 A1 | 6/2004 | Vinegar et al. |
| 2007/0148062 A1 | 6/2007 | Haas et al. |
| 2009/0000986 A1 | 1/2009 | Hassan et al. |
| 2012/0165581 A1* | 6/2012 | Dupassieux ............ C10G 3/42 585/240 |
| 2013/0152459 A1* | 6/2013 | Banerjee ................ C10G 45/02 44/308 |

* cited by examiner

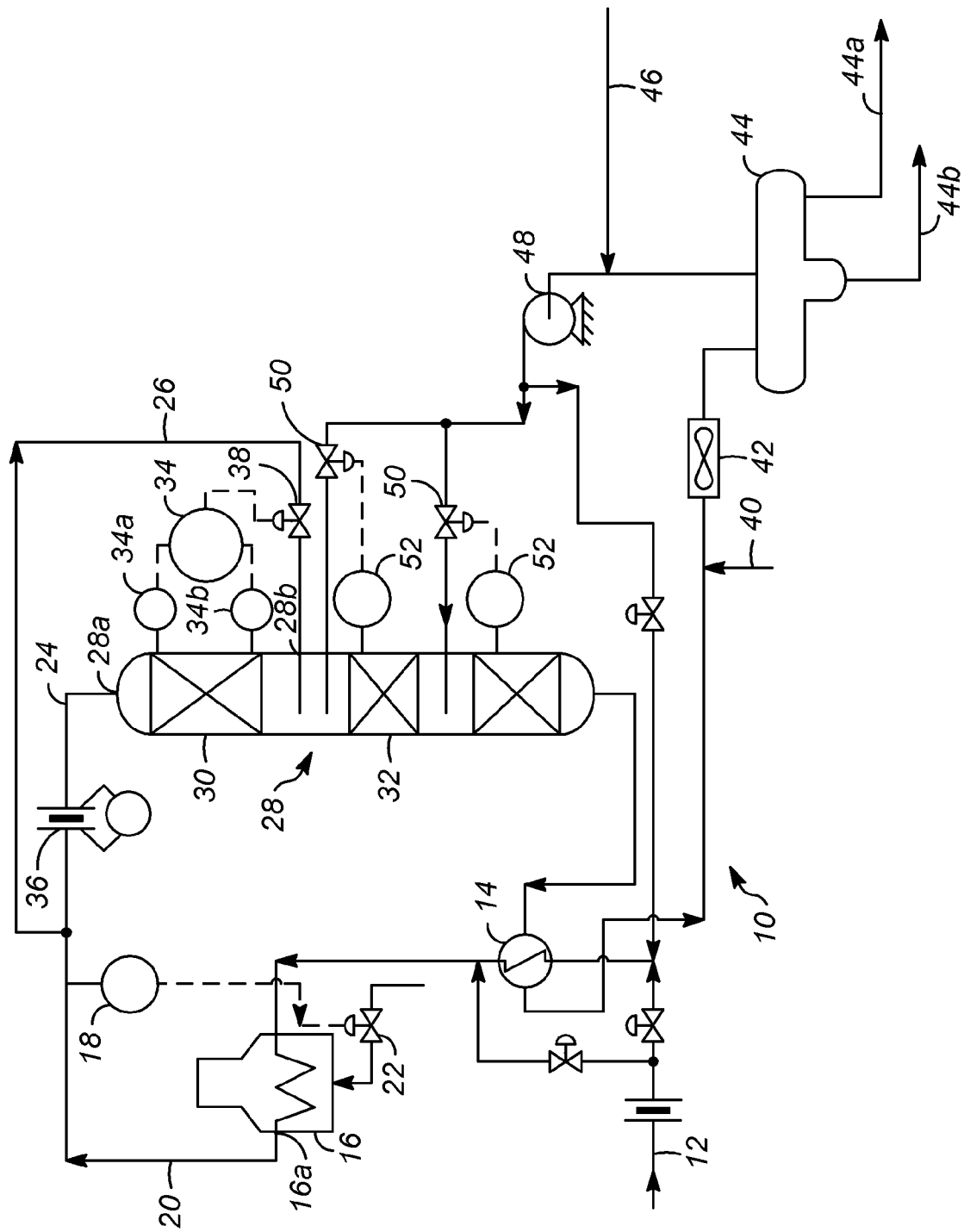

SPLIT FEED REACTOR BED IN HYDROTREATER DEVICE

BACKGROUND OF THE INVENTION

Naphtha blends, which can include fluid catalytic cracked naphtha, coker naphtha, straight run naphtha, or a combination thereof, are difficult to process. Such blends typically contain olefins in concentrations of 10-50% by volume. The olefins quickly saturate in the reactor bed upon contacting the reactor catalyst. Further, the olefins contacting the reactor catalyst results in an exothermic olefin conversion reaction, releasing substantial amounts of heat and causing the temperature of the first reactor bed to increase dramatically. Such temperature spikes can lead to deactivation of the first catalyst bed and often leads to difficulty in controlling temperatures in subsequent beds as well. Moreover, bed deactivation can cause the reactor to operate at less than its maximum efficiency, lowering the amount of cracked material that is processed by the unit or limiting the duration that the unit can operate.

One way to compensate for the temperature spike caused by the olefin conversion is to lower the charge heater outlet temperature. This can help, but still results in a temperature difference across the top reactor bed of 60° C.-120° C. However, turndown limitations of the charge heater restrict the capability to lower the charge heater outlet temperature.

Accordingly, there is a need for a process to regulate the temperature across the first bed consistently without disrupting function of the additional beds.

SUMMARY OF THE INVENTION

A first aspect of the invention is a hydrotreater reactor device including a reactor chamber having at least a first bed and a second bed. The reactor chamber also includes a first input disposed so as to provide a hydrocarbon vapor stream to the first bed and a second input disposed so as to bypass the first bed and provide a hydrocarbon vapor stream directly to the second bed. A differential temperature monitor is provided to measure a temperature difference across said first bed, and a control valve provided at the second input and connected to the differential temperature monitor is operable to adjust an amount of the hydrocarbon vapor stream admitted through the second input based on the temperature difference measured by the differential temperature monitor. A charge heater provides a vapor phase hydrocarbon stream as an output through an output line in fluid communication with the reactor chamber. The output line is split so that the output line is connected to the reactor at both the first input and the second input, and a restrictor is positioned downstream of the split to impose a pressure drop at the first input. The pressure drop across the restrictor is proportional to the flow rate and is provided so as to be able to maintain sufficient pressure differential across the control valve routing material to the second input so that it can operate properly.

Another aspect of the present invention is a method for hydrotreating a naphtha blend stream including providing a hydrotreater reactor having a first input disposed at a first bed and a second input disposed at a second bed bypassing the first bed. The naphtha blend stream is admitted to the reactor via a charge heater, wherein the stream is split so that the stream is admitted to the reactor at both the first input and the second input. The method further includes measuring a temperature difference across the first bed, and controlling distribution of the naphtha blend stream at the second input based on the measured temperature difference. Still another aspect of the present invention is a hydrotreater reactor that includes a first bed and a second bed disposed below the first bed. A first inlet is in fluid communication with the first bed, and a second inlet bypasses the first bed and is in fluid communication with the second bed. A temperature instrument measures a temperature difference across the first bed, and a control valve regulates flow through the second inlet based on the temperature difference measured by the temperature gauge.

BRIEF DESCRIPTION OF THE DRAWING

The FIGURE is a process flow diagram showing a reactor with a split feed for regulating temperature across a top bed.

DETAILED DESCRIPTION OF THE INVENTION

Referring now to the FIGURE, process flow for regulating temperature across a top bed of a reactor is generally designated 10. A naphtha blend feed hydrocarbon stream is input to the process at line 12, and optionally routed through a heat exchanger 14, which vaporizes the naphtha feed. The vapor-phase naphtha feed is then routed to a charge heater 16, which heats the naphtha feed to the reaction temperature and provides the heated stream as an output at a charge heater output 16a. A temperature indicator-controller 18 is positioned along an output line 20 exiting the charge heater 16 to monitor a temperature at the output 16a of the charge heater. The indicator-controller 18 is electrically connected to an adjustable control valve 22 which controls the amount of fuel provided to the charge heater 16, and thus regulates the temperature of the naphtha blend feed output by the charge heater.

Downstream from the temperature indicator-controller 18, the line 20 carrying the charge heater output stream is split to provide a first branch 24 and a second branch 26. The first branch 24 is connected to a reactor 28 at a first input 28a, while the second branch 26 is connected to the reactor at a second input 28b distant from the first input.

The reactor 28 is a multi-bed reactor, allowing fluid to flow through at least a first bed 30 and a second bed 32 sequentially. While a reactor 28 including a first bed and a second bed is shown and described herein, those of skill in the art will appreciate that additional beds may also be included in the reactor without departing from the scope of the invention. The first input 28a is disposed on the reactor 28 so that the input from the first branch 24 is in fluid communication with the first bed 30. The second input 28b is positioned so that the second input from the second branch 26 is in fluid communication with the second bed 32, without passing through the first bed 30.

Further, a differential temperature controller 34 is configured to measure a temperature difference across the first reactor bed 30. For example, as shown in the FIGURE, the differential temperature controller 34 includes a first temperature indicator 34a near a top of the first bed 30 and a second temperature indicator 34b near a bottom of the first bed to determine the differential temperature across the bed, and provides a signal indicating a differential temperature based on the difference in the temperatures measured by the first and second temperature indicators.

The first branch 24 connected to the first reactor input 28a includes a restrictor 36 to maintain sufficient pressure differential across a control valve 38 provided in the second branch 26 so that the control valve operates properly. The restrictor 36 is, for example, an eccentric orifice plate, a concentric orifice plate, a restrictive orifice, a control valve, or any other device known to control pressure within the line. Preferably, an eccentric orifice is used as the restrictor 36 to allow liquid to be passed to the reactor 28 from the charge heater output, particularly during a startup phase, before the charge heater 16 reaches its ideal temperature and the hydrocarbon feed in line 12 is fully vaporized.

The second branch 26 is connected to the reactor at the second input 28b via the control valve 38. The control valve 38 is operatively connected to the reactor differential temperature controller 34, and adjusts flow through the second branch 26 and into the second inlet on the basis of the measured temperature difference across the first bed 30. In this way, the flow of the naphtha blend in the second branch 26 can be adjusted based on the temperature rise across the first bed 30. This allows, for example, for flow through the second branch 26 to be increased as the measured temperature difference increases, thus limiting the temperature rise in the first bed 30 to a desired value.

The control valve 38 is preferably continuously adjustable to allow for a smooth gradation between fully open and fully closed. Alternatively, the valve 38 may include a finite number of states between open and closed. Still another alternative allows for the control valve 38 to be capable of only binary (i.e. open and closed) states, with the flow rate being varied by adjusting a "duty cycle" of the valve (i.e., the amount of time the valve is open as compared to the amount of time the valve is closed). No matter what type of valve 38 is used, the control valve receives a signal from the differential temperature controller 34 to affect control of the naphtha blend stream flow in the second branch 26. For example, the signal can indicate the temperature difference across the first bed 30 at predetermined intervals. As non-limiting examples, the temperature difference could be received once per second, once per minute, or once per hour. Those of skill in the art will recognize, however, that the temperature difference may be transmitted more or less frequently without departing from the scope of the invention. Alternatively, the differential temperature controller 34 can be configured to transmit particular signals to the control valve 38 at predetermined differential temperatures. For example, the controller 34 may transmit signals to the valve 38 when the differential temperature across the bed 30 is measured to be 50° C., 60° C., 75° C., and/or 100° C. Again, those of skill in the art will recognize that such signals could be generated at other and/or additional differential temperature measurements without departing from the scope of the invention.

The valve opening (or duty cycle) may be set based on the differential temperature reading from the controller 34 such that flow through the second branch 26 is increased as the differential temperature across the first bed 30 increases. As a non-limiting example, the control valve 38 is preferably adjusted to maintain a differential temperature of less than 100° C., and more preferably less than 75° C. To accommodate this, the second branch 26 may allow for flow of up to about 50% of the naphtha blend stream, thus allowing up to about 50% of the stream to bypass the first bed 30 and enter the reactor 28 at the second bed 32. More preferably, the second branch 26 and the control valve 38 allow for up to approximately 33% of the naphtha blend stream to enter the reactor at the second bed 32, while approximately 67% of the stream enters the reactor at the first bed 30. Thus, it is preferred that a majority of the hydrocarbon stream enters the reactor 28 at the first bed 30.

The reactor effluent leaves the reactor 28 through an outlet after passing through one or more of the reactor beds 30, 32. The effluent is preferably routed to the heat exchanger 14, where it warms the input feed line 12 prior to the input feed entering the charge heater 16. The effluent is then combined with a wash water stream 40 and cooled at a condenser 42. The output of the condenser 42 is then routed to a cold separator 44, which separates the condenser output into a hydrogen rich vapor stream, a hydrocarbon liquid stream and sour water. The liquid portion of the hydrocarbon stream is then routed to a stripper (not shown) through line 44a. The sour water is removed from the cold separator 44 via line 44b and is preferably processed in a downstream unit to remove impurities, such as hydrogen sulfide and ammonia, from the water.

The remaining vapor portion of the hydrocarbon stream is combined with makeup hydrogen gas 46 and is provided to the process 10 at both the reactor 28 and at the initial feed line 12 via a recycle gas compressor 48. Flow of this gas into the reactor 28 at each bed is regulated by a control valve 50 operatively connected to a temperature controller 52 which measures the temperature at the inlet of the catalyst bed below the recycle gas addition point.

Thus, bed temperature control (and olefin saturation) is achieved without any hydraulic penalty other than a small increase in recycle gas loop pressure drop due to the restrictive orifice plate 36 in the first branch 24.

While at least one exemplary embodiment has been presented in the foregoing detailed description, it should be appreciated that a vast number of variations exist. It should also be appreciated that the exemplary embodiment is merely an example, and is not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the invention as set forth in the appended claims.

What is claimed is:

1. A hydrotreater reactor device comprising:
   a reactor chamber including at least a first bed and a second bed, said reactor chamber further including a first input disposed so as to provide a hydrocarbon stream to said first bed and a second input disposed so as to bypass said first bed and provide a hydrocarbon stream to said second bed;
   a differential temperature controller provided to measure a temperature difference across said first bed;
   a control valve provided at said second input and connected to said differential temperature controller, wherein said control valve is operable to adjust an amount of the hydrocarbon stream admitted through said second input based on the temperature difference measured by said differential temperature controller;
   a charge heater providing a hydrocarbon stream as an output through an output line, said output line including a split so that a first branch of said output line is connected to said first input and in fluid communication with said first bed and a second branch of said output line is connected to said second input and in fluid communication with said second bed; and
   a restrictor positioned downstream of said split between said charge heater and said first input to control a pressure drop at said first input.

2. The hydrotreater reactor device of claim 1, wherein the hydrocarbon stream comprises one or more of fluid catalytic cracked naphtha, straight run naphtha, coker naphtha, and olefins.

3. The hydrotreater reactor device of claim 1, wherein said restrictor is selected from the group consisting of an eccentric orifice, a control valve, and a restrictive orifice.

4. The hydrotreater reactor device of claim 1, wherein said restrictor is an eccentric or concentric orifice.

5. The hydrotreater reactor device of claim 1, wherein the control valve adjusts an amount of the hydrocarbon stream admitted through said second input so that the measured temperature difference does not exceed approximately 100° C.

6. The hydrotreater reactor device of claim 5, wherein the control valve adjusts an amount of the hydrocarbon stream admitted through said second input so that the measured temperature difference does not exceed approximately 75° C.

7. The hydrotreater reactor device of claim 1, wherein a majority of the hydrocarbon stream is admitted to said reactor at said first input.

8. The hydrotreater reactor device of claim 7, wherein approximately 67% of the hydrocarbon stream is admitted to said reactor at said first input.

9. A hydrotreater reactor comprising:
a first bed;
a second bed disposed below said first bed;
a first input in fluid communication with said first bed;
a second input bypassing said first bed and in fluid communication with said second bed;
a temperature gauge for measuring a temperature difference across said first bed;
a control valve for regulating flow through said second input based on the temperature difference measured by said temperature gauge.

10. The hydrotreater reactor of claim 9, wherein said first inlet and said second inlet are connectable to an outlet from a charge heater.

11. The hydrotreater reactor of claim 9, wherein said control valve regulates flow so that the measured temperature difference does not exceed 100° C.

12. The hydrotreater reactor of claim 9, wherein the reactor is used to treat a naphtha blend including fluid catalytic cracked naphtha, straight run naphtha, and coker naphtha, and olefins.

* * * * *